(12) United States Patent
Wang et al.

(10) Patent No.: US 8,854,078 B1
(45) Date of Patent: *****Oct. 7, 2014

(54) DYNAMIC TERMINATION-IMPEDANCE CONTROL FOR BIDIRECTIONAL I/O PINS

(75) Inventors: Xiaobao Wang, Cupertino, CA (US);
Bonnie I. Wang, Cupertino, CA (US);
Chiakang Sung, Milpitas, CA (US);
Khai Q. Nguyen, San Jose, CA (US)

(73) Assignee: Altera Corporation, San Jose, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 13/223,989

(22) Filed: Sep. 1, 2011

Related U.S. Application Data

(63) Continuation of application No. 11/458,675, filed on Jul. 19, 2006, now Pat. No. 8,022,723.

(51) Int. Cl.
*H03K 17/16* (2006.01)

(52) U.S. Cl.
USPC .................. 326/30; 326/83; 326/86; 327/108

(58) Field of Classification Search
USPC ........................ 326/21, 26, 30, 81–83, 86–87; 327/108–109
See application file for complete search history.

(56) References Cited

U.S. PATENT DOCUMENTS

| | | | |
|---|---|---|---|
| 6,256,235 B1 * | 7/2001 | Lee | 365/189.11 |
| 6,452,428 B1 * | 9/2002 | Mooney et al. | 327/108 |
| 6,501,293 B2 * | 12/2002 | Braceras et al. | 326/30 |
| 6,531,892 B2 * | 3/2003 | Ghia et al. | 326/50 |
| 6,571,376 B1 | 5/2003 | Levin et al. | |
| 6,583,659 B1 * | 6/2003 | Kwong et al. | 327/295 |
| 6,836,142 B2 * | 12/2004 | Lesea et al. | 326/30 |
| 6,970,015 B1 * | 11/2005 | Chan et al. | 326/82 |
| 7,093,041 B2 | 8/2006 | Gasparik | |
| 7,205,786 B2 * | 4/2007 | Ahmad | 326/30 |
| 7,222,208 B1 | 5/2007 | Haycock et al. | |
| 2003/0062921 A1 | 4/2003 | Johnson et al. | |

* cited by examiner

*Primary Examiner* — Thienvu Tran
*Assistant Examiner* — Christopher Lo
(74) *Attorney, Agent, or Firm* — Ropes & Gray LLP; Jeffrey H. Ingerman

(57) ABSTRACT

Circuits, methods, and apparatus for dynamic control of source and termination impedances. One output stage provides a series termination when transmitting and a parallel termination when receiving data. A pull-up device has a nominal impedance of 50 ohms when the output stage pulls a pin from a low voltage to a high voltage, while a pull-down device has a nominal impedance of 50 ohms when the pin is pulled from a high voltage to a low voltage. Both the pull-up and pull-down devices are turned on when receiving data. Due to their non-linear current-voltage characteristics, the pull-up device appears as 50 ohms when the pin voltage is higher than one half the supply voltage, while the pull-down device appears as 50 ohms when the pin voltage is lower than one half the supply voltage. The pull-up and pull-down devices can be calibrated to provide a nominal 50 ohm impedance.

21 Claims, 11 Drawing Sheets

DYNAMIC TERMINATION-IMPEDANCE CONTROL FOR BIDIRECTIONAL I/O PINS

CROSS-REFERENCE TO RELATED APPLICATION

This application is a continuation of U.S. patent application Ser. No. 11/458,675, filed on Jul. 19, 2006 (now U.S. Pat. No. 8,022,723), the disclosure of which is hereby incorporated by reference herein in its entirety.

BACKGROUND

The present invention generally relates to termination impedances and more particularly to dynamically controlling termination impedances for input and output pins.

Data rates at integrated circuit input and output pins have increased dramatically the last several years, and further increases are sure to follow. These high data rates place strict requirements on signal integrity. Transmitted and received signals need to be substantially free from glitches and other undesirable artifacts to maintain the highest possible data rates.

Reflections due to impedance mismatches are one source of these artifacts. Reflections are caused when a signal is received from a transmission line by a receiver having an impedance that does not match the impedance of the transmission line. In short, this mismatch prevents some of the energy of the signal from being absorbed by the receiver. This unabsorbed energy is reflected back to the signal source. To prevent these reflections, a receiver termination impedance is connected from a receiver input to an AC ground, where the termination impedance matches the transmission line. Similarly, reflections can be caused by mismatches between a transmitter and its transmission line, so a source termination impedance is connected between a transmitter output and the transmission line.

The receiver termination impedance is in parallel with the receiver, so it is referred to as a parallel termination. Similarly, a source impedance is in series with a transmitting circuit, and is referred to as a series impedance. When signaling is limited to one direction, fixed series and parallel terminations can be used. A difficulty arises when bidirectional (or full duplex) signaling is used. A parallel termination used to receive signals creates an impedance mismatch when transmitting data. Similarly, a series termination used when transmitting causes an impedance mismatch when data is received.

It is desirable to be able to switch these impedances in and out of their transmitting and receiving circuits. That is, when one integrated circuit is transmitting, that integrated circuit should have a series termination, but when it is receiving, a parallel termination is required.

Accordingly, what is needed are circuits, methods, and apparatus that provide dynamic control of these series and parallel termination impedances.

SUMMARY

Accordingly, embodiments of the present invention provide circuits, methods, and apparatus for dynamic control of source and parallel termination impedances. One exemplary embodiment of the present invention includes an output stage that provides a series termination when transmitting and a parallel termination when receiving data. In one specific embodiment, these terminations have a nominal impedance of 50 ohms, though in other embodiments they may have other impedances, such as 100, 150, or 1 k ohms.

One embodiment of the present invention includes an output stage having p-channel pull-up, and n-channel pull-down MOSFET transistors having their drains connected to a pin of an integrated circuit. When the output stage is transmitting and pulling the pin from a low voltage to a high voltage, the pull-up device has a nominal output impedance of 50 ohms, while when the output stage is pulling the pin from a high voltage to a low voltage, the pull-down device has a nominal output impedance of 50 ohms.

When data is being received, both the pull-up and pull-down devices can either be tristated, or turned on to provide a 50-ohm parallel termination impedance. These devices each provide an impedance to an AC ground (VCC for the pull-up and ground for the pull-down) and are thus in parallel. However, due to their non-linear current-voltage characteristics, when the pin voltage is higher than one-half the supply voltage, the pull-up device appears as 50 ohms and the pull-down device appears as an open, while when the pin voltage is lower than one-half the supply voltage, the pull-down device appears as 50 ohms and the pull-up device appears as an open.

In one embodiment of the present invention, the pull-up and pull-down devices can be calibrated such that they provide 50-ohm impedances. This calibration can be used to remove or reduce impedance variations due to processing variations. Variations due to supply, temperature, or other conditions can be removed or reduced using this or other calibration techniques as well.

One embodiment of the present invention employs a calibration scheme where the sizes of the output transistors are scaled or adjusted until a desired impedance is reached for a transistor having specific drain-to-source and gate-to-source voltage conditions. In a specific embodiment, the output pull-up and pull-down devices are made up of several groups of devices connected in parallel. Each group of devices is driven by a separate predriver that may be individually enabled and disabled.

It should be noted that the non-linear characteristics of these transistors, as well as resolution errors inherent in a digital calibration scheme, and other effects, result in errors in the impedance levels that these output transistors provide. However, the circuitry simplification provided by embodiments of the present invention make these errors acceptable for many applications. Various embodiments of the present invention may incorporate one or more of these or the other features described herein.

A better understanding of the nature and advantages of the present invention may be gained with reference to the following detailed description and the accompanying drawings.

BRIEF DESCRIPTION OF THE DRAWINGS

FIG. 7A illustrates an n-channel transistor drain current as a function of its drain-to-source voltage, while

FIG. 9A illustrates current-to-voltage characteristics for both pull up and pull-down devices in an output stage according to an embodiment of the present invention, where VDSAT is greater than VCC/2 for both devices; while

FIG. 10A illustrates the composite impedance of the devices in FIG. 9A as a function of input voltage, while

DESCRIPTION OF EXEMPLARY EMBODIMENTS

Integrated circuits communicate with each other by transmitting and receiving data over data interfaces. One such interface may be designed such that a first integrated circuit transmits data to a second integrated circuit. The first integrated circuit includes a transmitting circuit while the second integrated circuit includes receiving circuitry. The two circuits are often connected to respective package pins using bond wires and package lead-frames. The two package pins can be connected using a printed circuit board trace.

The printed circuit-board trace may be a simple wire trace, or it may be a strip line used to model a transmission line. Alternately, an actual transmission line may be used, for example, where the transmitting and receiving integrated circuits are on separate printed circuit boards.

Again, it is desirable to maximize the rate at which in data is transferred at such an interface. Accordingly, signal integrity is very important at these interfaces, and it is desirable to reduce or eliminate effects that can corrupt signals. In particular, reflections can degrade signal integrity thus reducing an interface's maximum data rate. Again, these reflections can be caused by impedance mismatches between a source and its load. For this reason, in very high-speed applications, it is desirable to at least match impedances between a source and its load. Where the length of a trace or line from a transmitter to a receiver is appreciable, it is further desirable to match the impedance of the source to the line and to match the impedance of the line to the load. This may be done by using source and parallel termination resistors.

Figure 1:
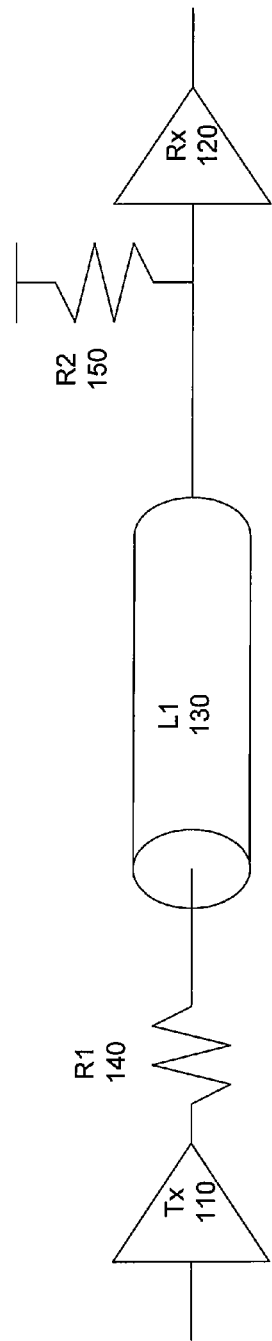
FIG. 1 is a schematic of a data interface including series and parallel termination resistors included to reduce signal reflections and improve signal quality.

FIG. 1 is a schematic of a data interface that employs series and parallel termination resistors to reduce signal reflections and improve signal quality. This figure, as with the other included figures, is shown for explanatory purposes and does not limit either the possible embodiments of the present invention or the claims.

This figure includes a transmitter Tx 110 communicating with a receiver Rx 120 over a transmission line L1 130. A resistor R1 140 is in series with the transmitter. For this reason, this termination resistor is referred to as a series termination impedance. Similarly, the receiver Rx 120 is in parallel with a resistor R2 150, which is appropriately referred to as a parallel termination impedance. The transmitter Tx 110 may be on a first integrated circuit, while the receiver Rx 120 is on a second. Resistor R1 140 may be on the first integrated circuit, or it may be off-chip. Similarly, resistor R2 150 may be on the second integrated circuit, or it may be off-chip.

The impedance R2 150 can be set to match the impedance of the transmission line L1 130. Accordingly, when a signal provided by the transmission line L1 130 reaches the receiver Rx 120, the energy of the signal is more fully absorbed by the resistor R2 150, and thus preventing, or at least reducing, the amount of energy reflected back towards the transmitter Tx 110.

Similarly, the combined resistance of the transmitter output and resistance R1 140 is set to match the impedance of the transmission line L1 130. In this way, the transmitted signal provided by the transmitter Tx 110 and resistor R1 140 is passed through the transmission line 130 to the receiver Rx 120, again preventing or reducing the energy reflected back from the transmission line outline to the transmitter Tx 110.

In many modern high-speed data interfaces, it is desirable to be able to send data not only from a first integrated circuit to a second integrated circuit, but also from the second integrated circuit to the first integrated circuit, while using the same in data interface. Accordingly, an embodiment of the present invention includes transmitting and receiving circuits connected to the same pin. In conventional circuits, when data is transmitted from a first integrated circuit to a second integrated circuit, the transmitter on the first integrated circuit is active while the transmitter on the second integrated circuit is placed in a high-impedance state. Similarly, when data is transmitted from the second integrated circuit to the first integrated circuit, the transmitter on the second integrated circuit is active, while the transmitter on the first integrated circuit is placed in a high-impedance state. Such an interface is referred to as a bidirectional or full-duplex interface.

A complication arises regarding these termination resistors in a bidirectional interface. Specifically, a series impedance that is useful when transmitting becomes an unwanted impedance when data is received. Similarly, an impedance that is useful when receiving becomes an unwanted impedance when transmitting. An example is shown in the following figure.

Figure 2:
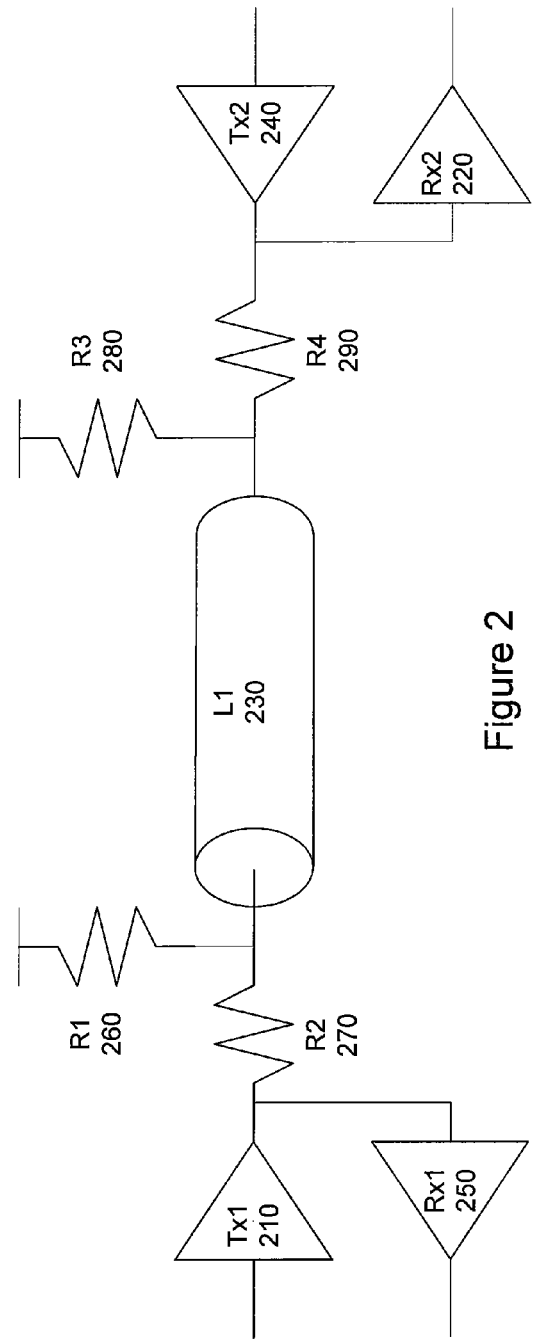
FIG. 2 is a schematic a bidirectional data interface that is improved by the incorporation of embodiment of the present invention.

FIG. 2 is a schematic a bidirectional data interface that is improved by the incorporation of embodiment of the present invention. This figure includes a first transmitter Tx1 210 and receiver Rx1 250 on a first integrated circuit and a second transmitter Tx2 240 and receiver Rx2 220 on a second integrated circuit. The circuits communicate via a transmission line L1 230.

In this example, series termination resistors R2 270 and R4 290 are used when data is transmitted, and parallel termination resistors R1 260 and R3 280 are used for receiving data.

Unfortunately, these resistors do not go away when they are not being used. For example, when transmitter Tx1 210 is transmitting, R1 260 causes a mismatch in the source impedance as compared to the impedance of transmission line L1 230.

Accordingly, it is desirable to effectively insert these resistances when needed and remove them when they are not. Unfortunately, this is very difficult to accomplish. For example, switches can be inserted in parallel or series with these impedances, but the device sizes of the switches would greatly increase the die area consumed by these input and output circuits. Also, other complications, such as parasitic capacitance, make this an undesirable solution. Accordingly, embodiments of the present invention utilize the impedances of transistors in the transmitting circuits and as series and parallel termination impedances. An example is shown in the following figure.

Figure 3:
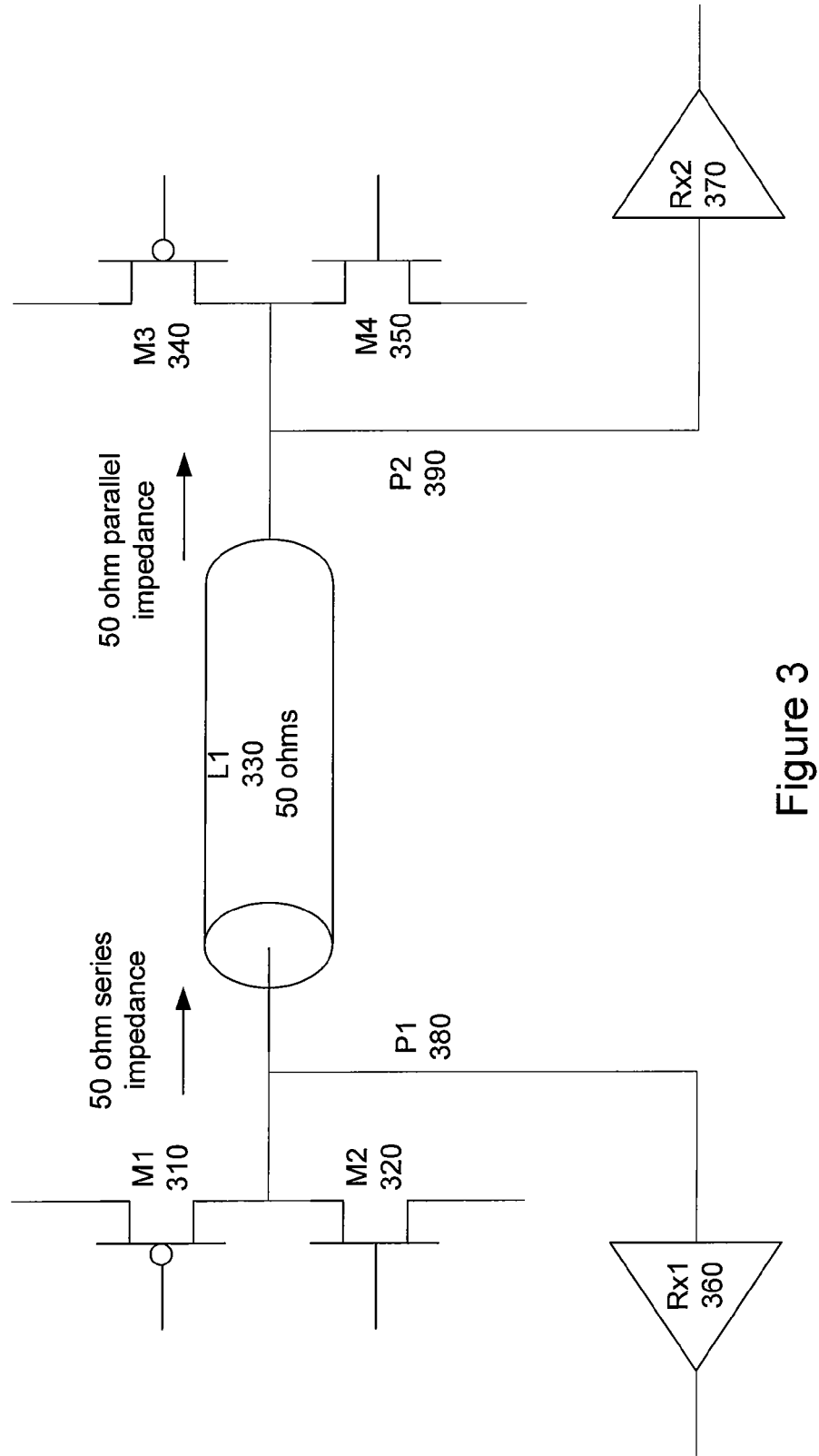
FIG. 3 is a schematic of a data interface where transmitter output transistors are used as either series or parallel terminations.

FIG. 3 is a schematic of a data interface where transmitter output transistors are used as either series or parallel terminations. In this specific example, the transistor provide 50-ohm impedances, though in other embodiments of the present invention, other impedances such as 100, 150, or 1 k ohms can be used.

This figure includes a first transmitter output stage including transistors M1 310 and M2 320, and a second transmitter output stage including transistors M3 340 and M4 350. Receiving circuits Rx1 360 and Rx2 370 are also included. The circuits communicate via transmission line L1 330. The transistors M1 310 and M2 320, and receiver Rx1 360 can be formed on a first integrated circuit and connected to a first pad, which is connected to pin P1 380, while transistors M3 340 and M4 350, and receiver Rx2 370 can be formed on a second integrated circuit and connected to a second pad, which is connected to pin P2 390.

When the first transmitter outputs data, a 50-ohm output impedance is provided by transistors M1 310 and M2 320. Specifically, when the first transmitter output pulls the voltage at its pin P1 380 high, transistor M1 310 provides a 50-ohm series impedance. Similarly, when the transmitter output pulls the voltage on P1 380 low, transistor M2 320 provides a 50-ohm series impedance. When the second receiver Rx2 370 is receiving data, the output transistors M3 330 and M4 340 provide a 50-ohm parallel impedance for the receiver Rx2 370.

The output transistors for the first transmitter, M1 310 and M2 320, and the output transistors for the second transmitter, M3 340 and M4 350, are shown as single transistors for simplicity. In typical embodiments of the present invention, these transistors are composites of several individual transistors connected in parallel. Further, these transistors may be grouped, where the drains, sources, and gates of the transistors in the groups are connected. In this configuration, the collective drains and sources of the groups are also connected, but the gates of each group are driven by separate predrivers. In this way, some of the groups of transistors may be effectively disconnected or removed from the transmitter output circuit by turning them off under all conditions. This may be done, for example, during a calibration routine where the sizes of the output devices are calibrated to provide a desirable impedance level.

The output impedance of transistors, such as transistors M1 310 and M2 320, vary as a function of temperature, device processing, and supply voltage. Thus, the sizes of the transistors M1 310 and M2 320 often need to be calibrated to provide accurate impedances. Again, this is done by disabling or enabling various groups of transistors that make up transistors M1 310 and M2 320. Similarly, the transistors M3 330 and M4 340 can also be calibrated.

Thus, each group of transistors can be enabled to form a transmitter output when transmitting data, enabled to form a parallel termination data is received, or they can be disconnected or disabled during calibration. Also, the output transistors can be tri-stated to support other configurations. A predriver circuit that performs these functions is shown in the following figure.

Figure 4:
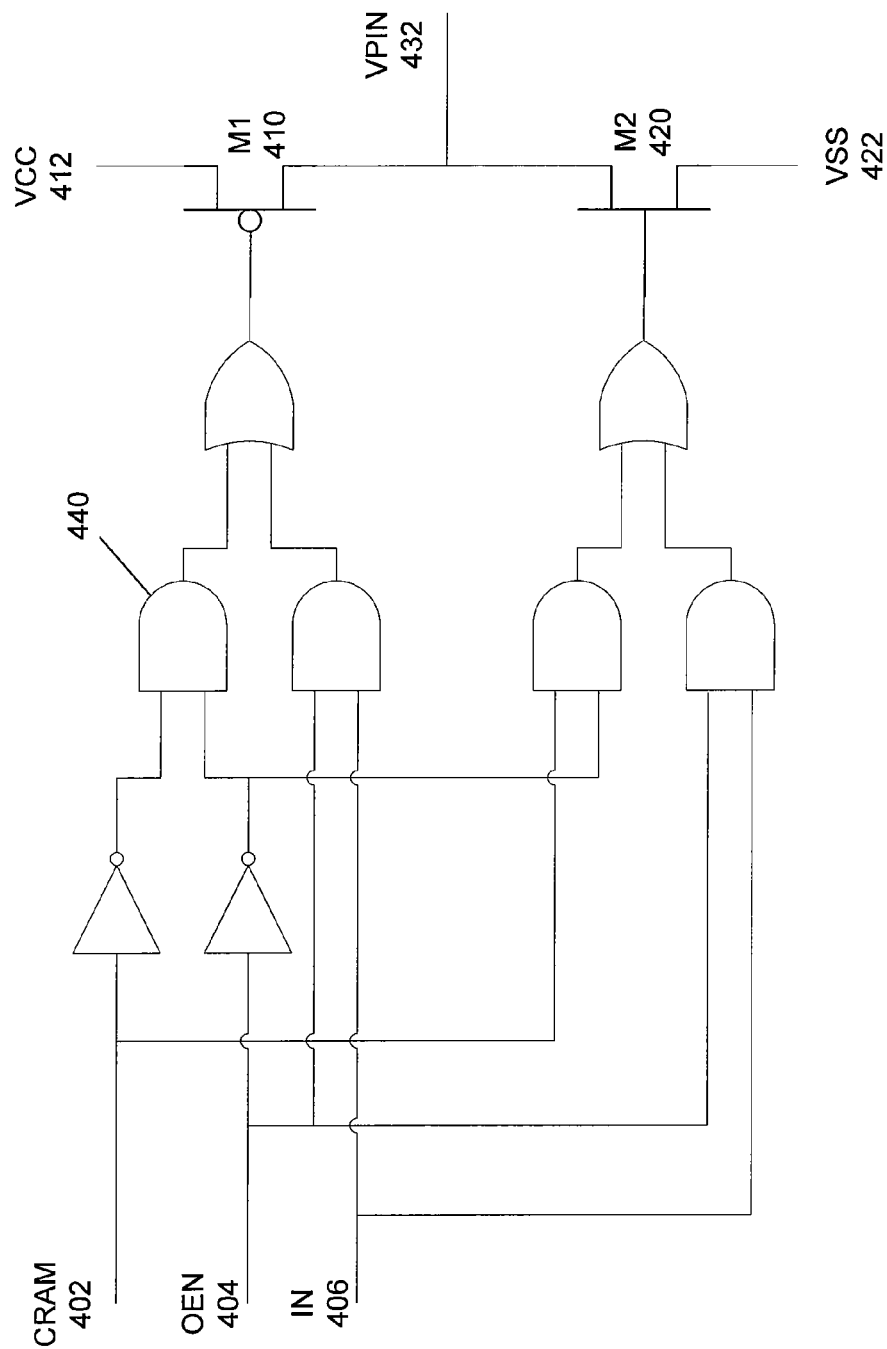
FIG. 4 is a schematic of a predriver circuit according to an embodiment of the present invention.

FIG. 4 is a schematic of a predriver circuit according to an embodiment of the present invention. It will be apparent to one skilled in the art that many different circuits may be used to implement this or similar logic functions consistent with embodiments of the present invention.

This figure includes a pull-up path or device M1 410 and pull-down path or device M2 420, the gates of which are driven by logic circuitry 440. The logic circuitry 440 receives a programmable bit CRAM on line 402, an output enable signal OEN 404, and a data input signal IN 406. The truth table for the logic is as follows:

| CRAM | OEN | IN | M1  | M2  |
|------|-----|----|-----|-----|
| X    | 1   | 0  | ON  | OFF |
| X    | 1   | 1  | OFF | ON  |
| 0    | 0   | X  | OFF | OFF |
| 1    | 0   | X  | ON  | ON  | where "X" is a don't care, and when M1 is on, it provides an impedance to VCC and when M2 is on, it provides an impedance to ground. Specifically, when M1 and M2 are transmitting, they alternate in providing a series termination, while the output is to be high, that is, it is high or is being pulled high, M1 provides the series impedance, while when the output is to be low, that is, it is low or is being pulled low, M2 provides the series impedance. When M1 and M2 are turned on while receiving, they combine to provide a parallel impedance. While other logic circuits and truth tables can be used by embodiments of the present invention, this arrangement allows one bit, CRAM, to be used to dynamically select between high impedance or parallel termination configurations when receiving data. Also, while in this example, this dynamic selection is done by a configurable RAM bit, in other embodiments, this selection may be done by other signals provided by other sources, such as programmable logic elements or user inputs.

Accordingly, this predriver can be used in a bidirectional interface where the transmitter output devices are used either as series or parallel termination impedances. Again, in an embodiment of the present invention, several predrivers are used to comment each driving group transistors that have their sources and drains connected. An example of a bidirectional data interface that employs this predriver is shown in the following figure.

Figure 5:
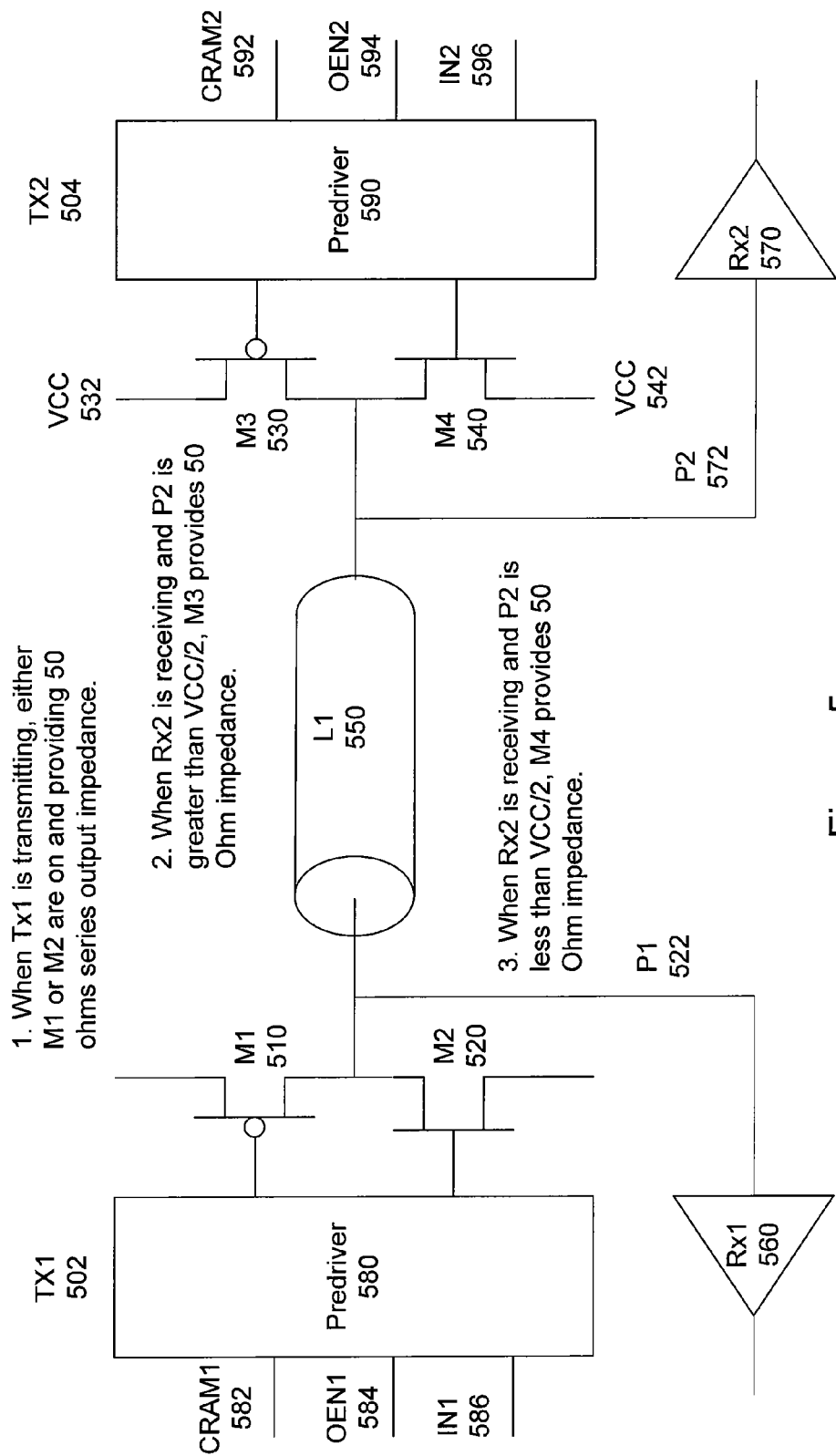
FIG. 5 is a schematic of a bidirectional interface utilizing the predriver of FIG. 4.

FIG. 5 is a schematic of a bidirectional interface utilizing the predriver of FIG. 4. This figure includes circuitry for a first integrated circuit including an output transmitter including predriver 580, transistors M1 510 and M2 520, and receiver 560, as well as a second integrated circuit including output transmitter including predriver 590, transistors M3 530 and M4 540, and receiver 570. The first and second integrated circuits communicate via transmission line L1 550.

In this example, when transmitter TX1 502 is transmitting, either M1 510 or M2 520 are turned on and providing a 50-ohm series output impedance. Specifically, when the voltage on the pad P1 522 is being pulled high, that is, when the voltage on the pad P1 522 is to be high, transistor M1 510 provides a pull up path having a desired series output impedance. Similarly, when the voltage on the pad P1 522 is to be pulled low, transistor M2 520 provides a pull-down path having a desired output impedance.

The input parallel impedance provided by transistors M3 530 and M4 540 are nonlinear. Specifically, for a first range of the drain-to-source voltage, where the transistors are in their linear or triode region, the devices provide an impedance that is relatively linear. However outside of this range, where the devices enter their saturation region, the impedance becomes nonlinear, typically increasing rapidly as the drain-to-source voltage increases. At this point, the impedance is determined primarily by the devices channel-length modulation.

Accordingly, when the second receiver 570 is receiving and the voltage on the pad P2 572 is greater than half the supply voltage, transistor M3 530 provides the desired input impedance. Similarly, when the second receiver 570 is receiving and the voltage on the pad P2 572 is less than half the supply voltage, transistor M4 540 provides the desired input impedance. A flowchart illustrating this operation is shown in the following figure.

Figure 6:
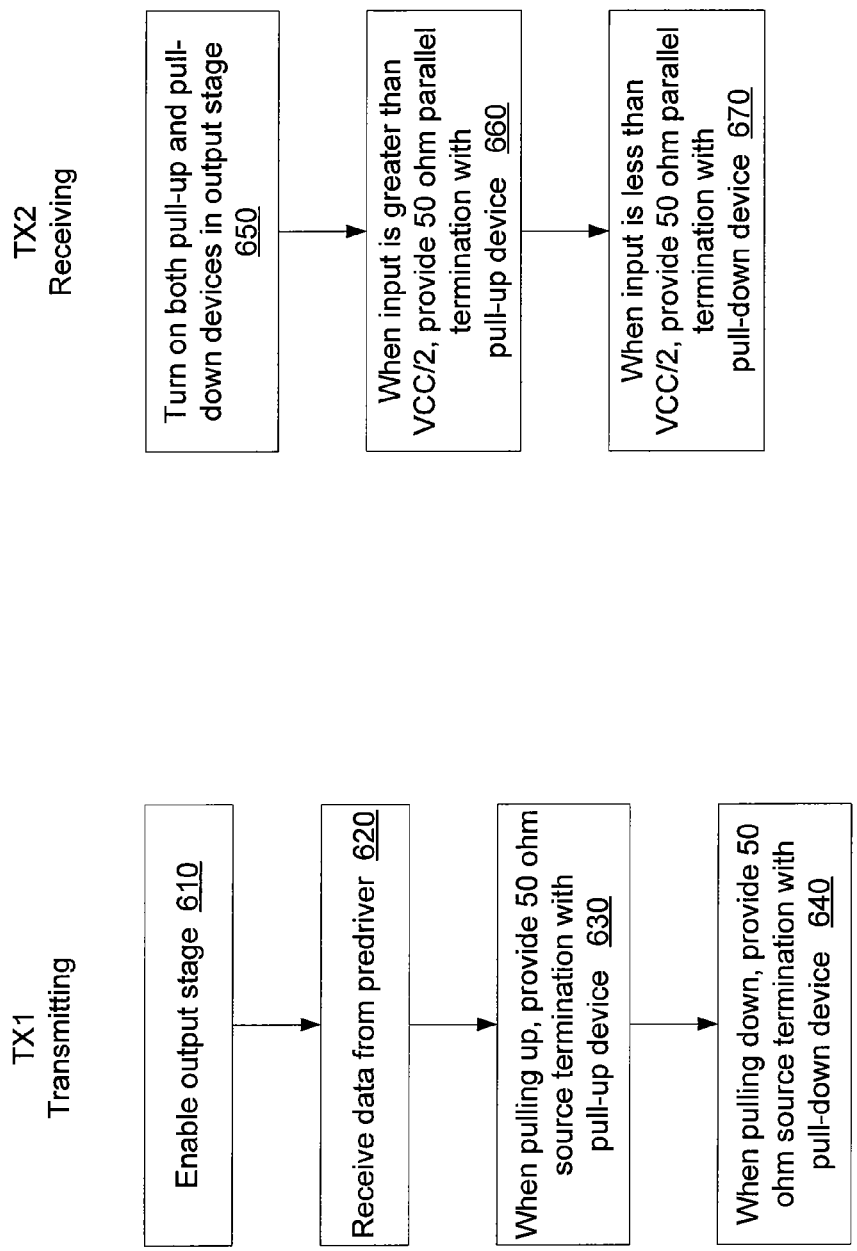
FIG. 6 is a flowchart illustrating the operation of transmitter output stage when transmitting and receiving data.

FIG. 6 is a flowchart illustrating the operation of transmitter output stage when transmitting and receiving data. In this embodiment of the present invention, transmitter output transistors provide a series termination impedance when transmitting data and a parallel termination impedance when receiving data.

Specifically, when a transmitter is transmitting, the outputs stage is enabled in act 610. In act 620, data is received from a predriver. When the transmitter output is pulling high, a 50-ohm source termination is provided with a pull-up device in act 630. Similarly, when the transmitter output is pulling down, a 50-ohm source termination is provided with a pull-down device in act 640.

When receiving, both pull-up and pull-down devices in the output stage are turned on in act 650. When the input is greater than VCC/2, the series termination impedance is provided by the pull-up device in act 660. When the input is less than half supply voltage, the parallel termination input impedance is provided by the pull down device in act 670.

Unfortunately, the impedance provided in this manner can be inaccurate, in large part due to the non-linearity of the current-voltage characteristics of the devices used. However, the simplicity of design and implementation provided compensates for these inaccuracies in many applications. To increase accuracy, a specific embodiment of the present invention calibrates the sizes of the output transistors to provide approximately a 50-ohm impedance when the drain-to-source voltage is one half the devices gate-to-source voltage.

Specifically, these transistors are often biased such that their gate to source voltage is equal to the supply voltage, for example VCC. The impedance of the transistor is thus calibrated to be 50 ohms when the drain to source voltage is VCC/2. Examples are shown in the following figures.

Figure 7A:
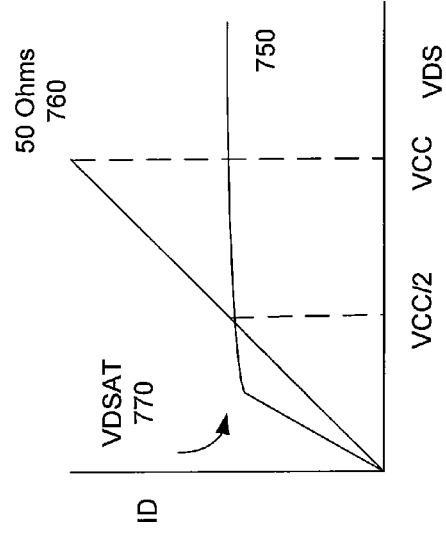

FIG. 7A illustrates an n-channel transistor drain current as a function of device drain-to-source voltage. In this example, curve 710 is generated for an n-channel pull-down device by changing its drain-to-source voltage when its gate-to-source voltage is VCC. The line 720 represents an ideal 50-ohm impedance. Transistor curve 710 is compared to 50 ohm line 720 by a calibration circuit, for example the calibration circuit described below. In short, if the transistor is made larger (more groups of transistors enabled), the curve 710 is raised, reflecting the higher current provided by a large device. Similarly, if the transistor is made smaller (more groups of transistors disabled), the curve 710 is lowered. Accordingly, transistors are either inserted or removed from the output pulled-down path until the curve 710 matches the 50-ohm line 720 at a drain-to-source voltage of VCC/2. In this way, the impedance provided by the pull-down path closely approximates 50 ohms from a VDS of zero to VDSAT 730. For VDS voltages greater than VDSAT 730, the output impedance increases. This can be seen in FIG. 8A.

Figure 8A:
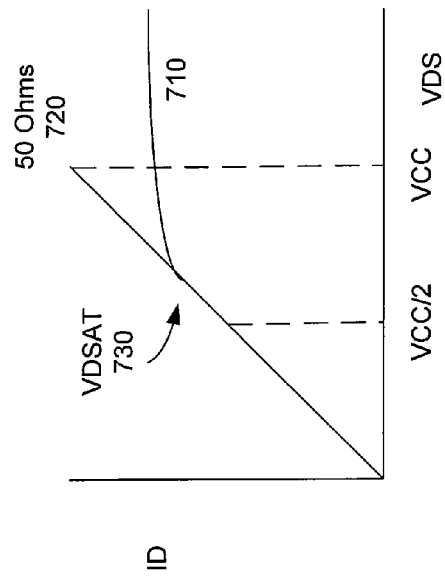
FIG. 8A illustrates an output impedance of a pull-down path as a function of drain-to-source voltage; while FIG. 8 B illustrates an output impedance of a pull-up path as a function of drain-to-source voltage.

FIG. 8A illustrates the output impedance of a pull-down path as a function of drain-to-source voltage. The output impedance curve 810 is the first derivative of the current-to-voltage characteristic 710 in FIG. 7A. For low VDS voltages, the output impedance is near 50 ohms, while the output impedance increases as VDS voltages approach VCC.

In this example, the VDSAT voltage 730 is greater than VCC/2. However, the VDSAT voltage may be less than VCC/2, depending on specific process characteristics and the supply voltages used. This is shown in the following figure.

Figure 7B:
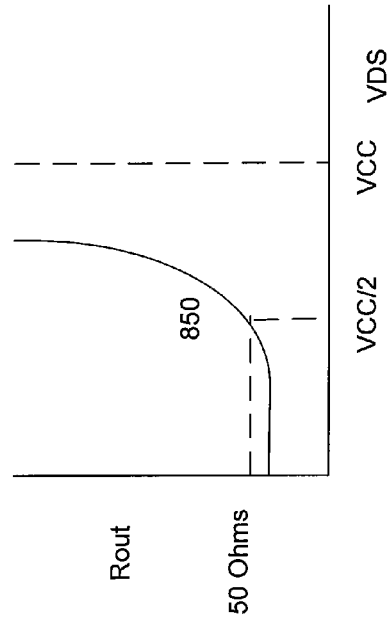
FIG. 7B illustrates a p-channel transistor drain current as a function of its drain-to-source voltage.

FIG. 7B is an illustrative example of a current-to-voltage characteristic for a pull-down device utilized by an embodiment of the present invention. Again, the size of the pull-down device is calibrated until the current voltage curve 750 approximately matches the 50-ohm curve 760 at VCC/2. When VDSAT 770 is less than VCC/2, the output impedance only matches the 50 ohm impedance 760 at VCC/2. This can be seen in the following figure.

Figure 8B:
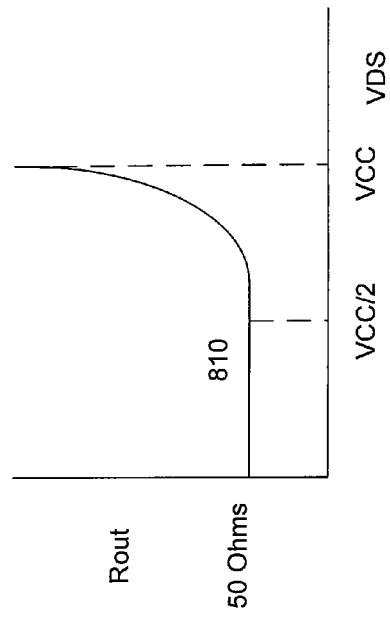

FIG. 8B illustrates the impedance of a pull-down device employed by an embodiment of the present invention. As can be seen, for voltages below VCC/2, the series termination impedance provided is less than 50 ohms, while above VCC/2, the output impedance is greater than 50 ohms.

As can be seen, whether VDSAT is greater than or less than VCC/2, the output impedance provided by these devices can be calibrated to be roughly 50 ohms below VCC/2 and a high impedance above VCC/2. Accordingly, two such devices, one p-channel and one n-channel, may be used together to form a parallel termination impedance. This is shown in the following figures.

Figure 9B:
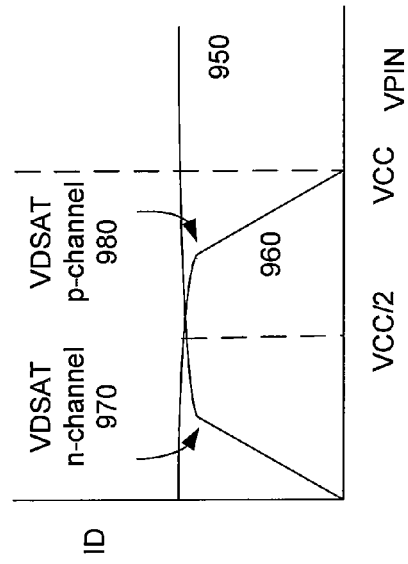
FIG. 9B illustrates current-to-voltage characteristics for both pull up and pull-down devices in an output stage according to an embodiment of the present invention, where VDSAT is less than VCC/2 for both devices.
Figure 9A:
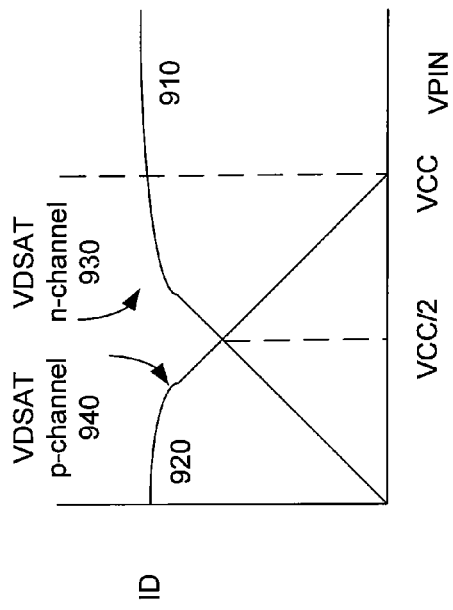

FIG. 9A illustrates the current-to-voltage characteristics for both pull up and pull-down devices in an output stage according to an embodiment of the present invention. This figure includes a current-to-voltage characteristic 910 for a pull-down device and a current-to-voltage characteristic 940 for a pull up device. In this example, the VDSAT voltages are greater than VCC/2 for both devices.

Figure 10B:
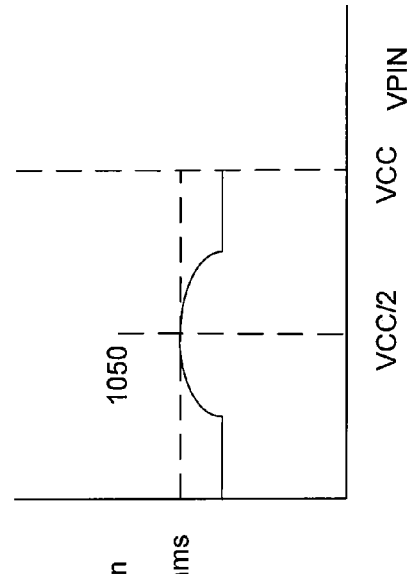
FIG. 10B illustrates the composite impedance of the devices in FIG. 9B as a function of input voltage.
Figure 10A:
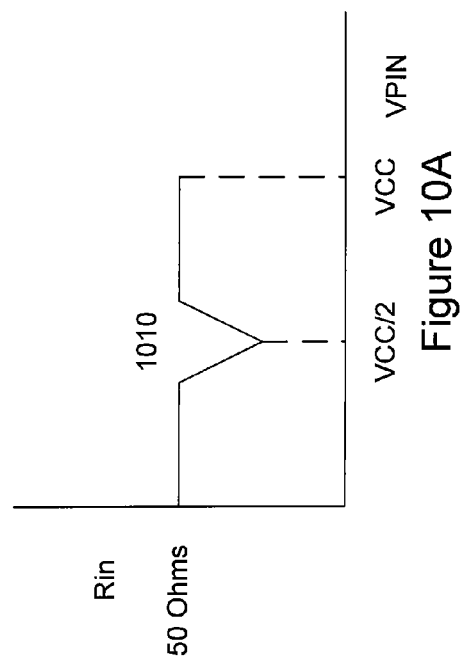

FIG. 10A illustrates the composite impedance of the devices in FIG. 9A as a function of input voltage. Specifically, the input impedance is approximately 50 ohms in the regions where one of the two transistors provides a high impedance. Near VCC/2, where both transistors are in their linear range, the input impedance drops below 50 ohms.

FIG. 9B illustrates the current voltage characteristics 950 of a pull-down device and the current voltage characteristics 960 of a pull-up device utilized by in output stage according to an embodiment of the present invention. In this example, the VDSAT voltage is less than VCC/2 for both devices.

FIG. 10B illustrates the composite impedance provided by these devices. As can be seen, away from VCC/2, the input impedance is less than 50 ohms, while near VCC/2, the impedance increases.

As can be seen, these output stage transistors provide series and parallel termination impedances that vary from 50 ohms in some circumstances. This mismatch may result in some amount of reflection while transmitting and receiving signals. However, as mentioned above, the simplification made possible by embodiments of the present invention makes this level of error acceptable in many applications. Examples of how these pull-up and pull-down devices are calibrated are shown in the following figures.

Figure 11:
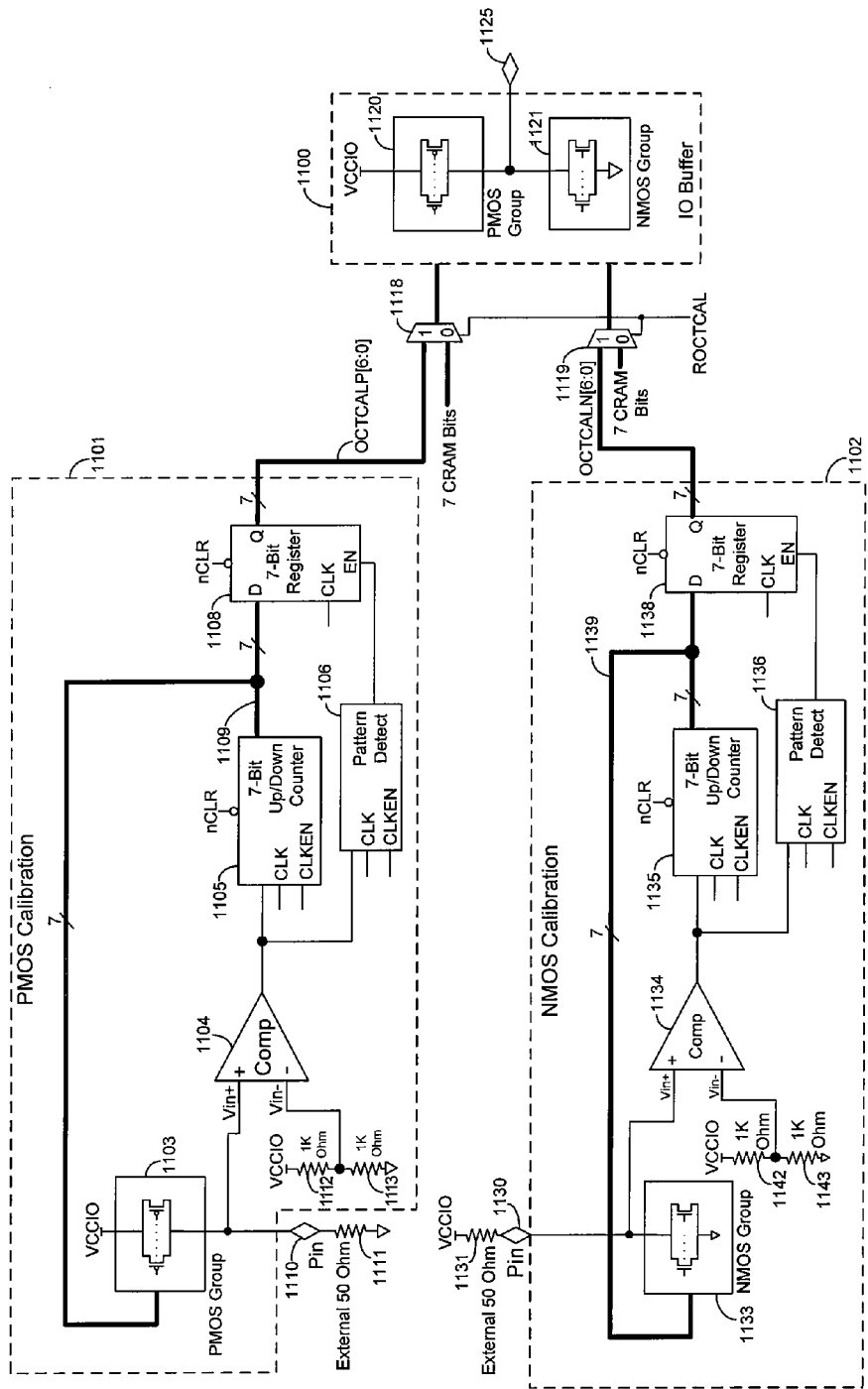
FIG. 11 illustrates calibration circuits that control the termination resistance in an IO buffer according to an embodiment of the present invention.
Figure 12:
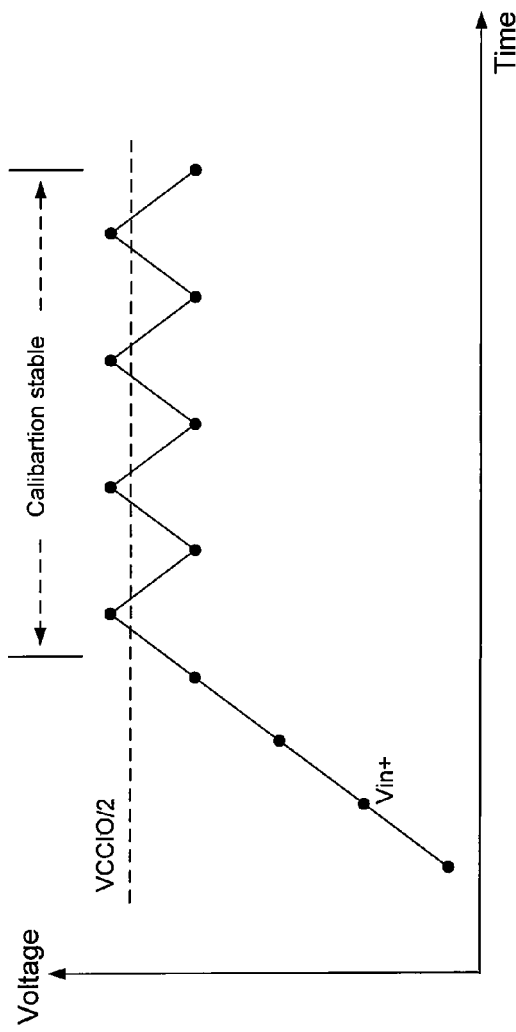
FIG. 12 is a graph that illustrates the voltage at the positive inputs of the comparators in FIG. 11, according to the present invention.
Figure 13:
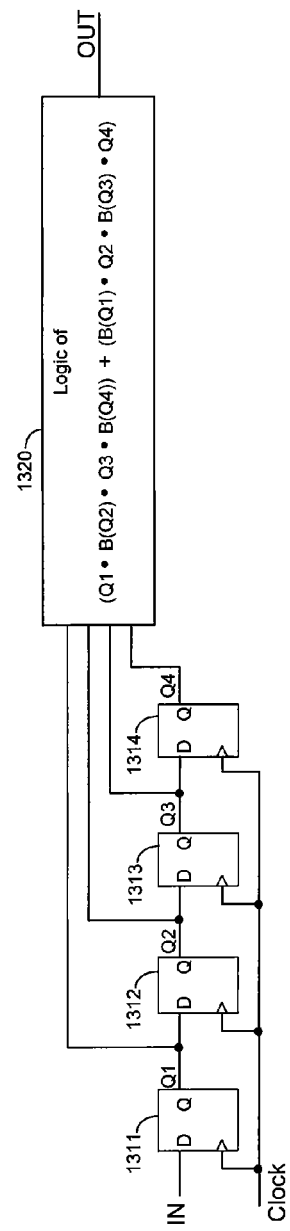
FIG. 13 illustrates an example of the pattern detect circuits shown in FIG. 11, according to an embodiment of the present invention.

FIG. 11 illustrates a p-channel or PMOS calibration circuit 1101 and an n-channel or NMOS calibration circuit 1102 according to embodiments of the present invention. PMOS calibration circuit 1101 controls the series termination resistance of pull-up PMOS transistors 1120 in input/output (JO) buffer 1100. NMOS calibration circuit 1102 controls the series termination resistance of pull-down NMOS transistors 1121 in IO buffer 1100. Transistor groups 1120 and 1121 drive output signals to IO pin 1125.

The transistors in groups 1120 and 1121 are binary-weighted, parallel-connected transistors. For example, transistor groups 1120 and 1121 can each have 7 transistors with channel width-to-length (W/L) ratios of 1×, 2×, 4×, 8×, 16×, 32×, and 64×. The transistors in groups 1120 and 1121 are controlled by configurable RAM (CRAM) bits or by calibration signals from circuits 1101 and 1102. The total drive current strength provided to pin 1125 equals the sum of the transistor currents in driver 1100. The impedance of driver 1100 is inversely proportional to the driver strength.

PMOS calibration circuit 1101 has a calibration pin 1110, and NMOS calibration circuit 1102 has a calibration pin 1130. A user can couple an external resistor 1111 to pin 1110 to select the series termination resistance for the pull-up PMOS transistors in group 1120. The user can couple an external resistor 1131 to pin 1130 to select the series termination resistance for the pull-down NMOS transistors in group 1121.

The calibration circuits 1101 and 1102 cause the termination resistance of transistor groups 1120 and 1121 to match external resistors 1111 and 1131, respectively. For example, if a user couples 50 Ohm external resistors to calibration pins 1110 and 1130 as shown in FIG. 11, calibration circuits 1101 and 1102 cause transistor groups 1120 and 1121 to each have an effective resistance of about 50 Ohms. 50 Ohm resistors are shown in FIG. 11 merely as examples. Any suitable resistor values can be selected.

PMOS calibration block 1101 has a group of PMOS transistors 1103 that are coupled in parallel between pin 1110 and supply voltage VCCIO. PMOS group 1103 can have any desired number of transistors (e.g., 7). Transistors in group 1103 have different channel width-to-length ratios (e.g., 1×, 2×, 4×, 8×, 16×, 32×, and 64×). Each transistor in PMOS group 1103 is typically equivalent in size (channel W/L ratio) to a corresponding pull-up PMOS drive transistor in group 1120.

The effective resistance of transistor group 1103 can be varied by turning on different combinations of the PMOS transistors. The transistors in group 1103 and external resistor 1111 form a resistor divider. The positive input of comparator 1104 is coupled to this resistor divider. Thus, comparator 1104 receives the voltage Vin+ of the resistor divider at its positive input.

The effective resistance of transistor group 1103 and resistor 1111 control the voltage level at the positive input (Vin+) of comparator 1104. Voltage Vin+ varies in response to turning on different combinations of the transistors in group 1103. The negative input (Vin−) of comparator 1104 receives a reference voltage that equals half the supply voltage VCCIO/2. The reference voltage is generated by resistors 1112 and 1113. The output of comparator 1104 is coupled to an input of 7-bit up/down counter 1105 and an input pattern detect circuit 1106. Counter 1105 generates 7 digital count signals 1109 at its outputs.

When the voltage Vin+ at the positive input of comparator 1104 is less than the voltage at the negative input of comparator 1104 (VCCIO/2), the output voltage of comparator 1104 is low. When the output of comparator 1104 is low, counter 1105 causes the digital binary value of the 7 count signals 1109 to decrease. For example, when the output of comparator 1104 is low, the digital value of count signals 1109 may decrease from 1111111 to 1111110 to 1111101, to 1111100, etc., where the ones and zeros correspond to digital high and low voltages, respectively.

The 7 count signals 1109 control the gate voltages of the 7 transistors in PMOS transistor group 1103. Typically, the least significant bit of the count signals controls the smallest sized transistor in group 1103, and the most significant bit controls the largest transistor in group 1103. When the binary values of the 7 count signals 1109 decrease, the effective resistance of PMOS group 1103 decreases.

If the voltage Vin+ at the positive input of comparator 1104 exceeds the voltage at the negative input of comparator 1104 (VCCIO/2), the output voltage of comparator 1104 is high. When the output of comparator 1104 is high, counter 1105 causes the digital binary value of count signals 1109 to increase. When the binary value of count signals 1109 increases, the effective resistance of PMOS group 1103 increases, as more of the transistors turn off.

The voltage Vin+ at the positive input of comparator 1104 increases until it rises above half the supply voltage VCCIO/2. After Vin+ initially rises above VCCIO/2, the calibration becomes stable, and voltage Vin+ oscillates across the VCCIO/2 threshold level as shown in the graph of FIG. 2. Each point on the Vin+ line of FIG. 2 corresponds to a particular binary value of count signals 1109. When voltage Vin+ oscillates around VCCIO/2 as shown in FIG. 2, the effective resistance of PMOS group 1103 has come as close to the resistance of external resistor 1111 as calibration circuit 1101 can get it.

A pattern detect circuit 1106 in calibration circuit 1101 detects the toggling output voltage of comparator 1104 and enables register 1108 to latch the values of count signals 1109. FIG. 3 illustrates an example of pattern detect circuit 1106. Pattern detect circuit 1106 monitors the output voltage of comparator 1104. When the output voltage of comparator 1104 toggles between logic states 0→1→0→1 or 1→0→1→0, the output voltage of pattern detect circuit 1106 goes high. Thus, pattern detect circuit 1106 looks for at least three high-to-low or low-to-high transitions in the output of comparator 1104, indicating that Vin+ is oscillating above and below VCCIO/2 as shown in FIG. 2.

Serially coupled flip-flops 311-314 store the voltages at their D inputs on rising edges of the clock signal. The D input of flip-flop 311 is coupled to the output of comparator 1104. The output voltages of flip-flops 311-314 are Q1-Q4, respectively. Block 320 contains logic gates that implement the logic function, (Q1·B(Q2)·Q3·B(Q4))+(B(Q1)·Q2·B(Q3) ·Q4), where · refers to an AND function, + refers to an OR function, and B() refers to an inverse function.

The output signal OUT of pattern detect circuit 1106 transitions from low to high when it detects the output voltage of comparator 1104 satisfies the logic function of logic block 320. The output of circuit 1106 is coupled to the enable input of register 1108. Register 1108 includes 7 serially coupled flip-flops that store the 7 count signals OCTCALP[6:0] on a rising edge of the output signal of pattern detect circuit 1106. Count signals OCTCALP[6:0] can be transmitted through multiplexer 1118 to IO buffer 1100 to control the termination resistance of transistors in PMOS group 1120.

The inputs of multiplexer 1118 are coupled to the Q outputs of register 1108 and 7 CRAM bits. The output signals of multiplexer 1118 are transmitted to transistors in PMOS group 1120 within IO buffer 1100. A CRAM bit ROCTCAL determines whether multiplexer 1118 selects signals OCTCALP[6:0] or the 7 CRAM bits to control the termination resistance of PMOS group 1120.

Multiplexer 1118 can be set to select the OCTCALP[6:0] signals when a user wants the termination resistance of PMOS group 1120 to match the resistance of external resistor 1111. When multiplexer 1118 selects signals OCTCALP[6:0], PMOS group 1120 has the same effective resistance as PMOS group 1103, which is set to match resistor 1111. When matching the resistance of PMOS group 1120 to resistor 1111, calibration circuit 1101 compensates for silicon process, voltage, and temperature (PVT) variations on the integrated circuit. As a result, calibration circuit 1101 can achieve a very accurate termination resistance (e.g., a +/−10% variation).

The OCTCALP[6:0] signals, can be used to control the termination resistance of pull-up transistors that are coupled to multiple pins. For example, the OCTCALP[6:0] signals can control the pull-up termination resistance for all of the IO pins in an IO bank.

Alternatively, multiplexer 1118 can be set to select 7 CRAM bits to control the termination resistance of PMOS group 1120. A user can set the CRAM bits to any desired value. The CRAM bits set the drive strength of PMOS group 1120 in order to achieve a desired pull-up termination resistance (e.g., 25 Ohm or 50 Ohm). The CRAM termination control technique does not need a dedicated control circuit, and has zero cost in terms of die size.

To achieve a desired termination resistance (Rs) for PMOS group 1120 (or NMOS group 1121), a corresponding drive current is calculated at a pin voltage of ½ the supply voltage VCCIO using the equation: I=VCCIO/(2×Rs). For example, I=25 mA if VCCIO=2.5 volts and Rs=50 Ohm (i.e., set the driver strength to 25 mA at Vpin=½ VCCIO). This technique achieves a reasonably accurate termination resistance (+/−30% variation). The transistor resistance is calculated at ½ VCCIO, because a signal of half the output voltage swing travels from the output buffer and is reflected at an open ended transmission line. The reflected waveform returns to the output buffer, and results in the full output swing, preventing the output signal from reflecting back-and-forth in the transmission line.

FIG. 11 also illustrates an NMOS calibration block 1102. Multiplexer 1119 can select the output signals OCTCALN[6:0] of NMOS calibration block 1102 to control the termination resistance of transistors in NMOS group 1121. The transistors in NMOS group 1121 are pull-down transistors for IO pin 1125.

Alternatively, multiplexer 1119 can select 7 CRAM bits to control the termination resistance of NMOS group 1121. Multiplexer 1119 is control by CRAM bit ROCTCAL. A user can set the CRAM bits to any desired value. The CRAM bits set the drive strength of NMOS group 1121 in order to achieve a desired pull-down termination resistance.

NMOS calibration circuit 1102 operates in a similar manner to PMOS calibration circuit 1101. NMOS calibration block 1102 has a group of NMOS transistors 1133 that are coupled in parallel between pin 1130 and ground. An external resistor 1131 can be coupled to pin 1130.

Transistor group 1133 can have any number of transistors (e.g., 7). Transistors in group 1133 can have different channel width-to-length ratios (e.g., 1×, 2×, 4×, 8×, 16×, 32×, and 64×). Each transistor in NMOS group 1133 is typically equivalent in size (channel W/L ratio) to a corresponding pull-down NMOS drive transistor in group 1121.

The positive input of comparator 1134 is coupled to pin 1130 and transistors 1133. The negative input of comparator 1134 is coupled between resistors 1142 and 1143. If the voltage Vin+ at the positive input of comparator 1134 is higher than the voltage at the negative input of comparator 1134 (VCCIO/2), the output voltage of comparator 1134 is high.

When the output voltage of comparator 1134 is high, 7-bit up/down counter 1135 causes its 7 output count signals 1139 to count up. The count signals 1139 control the gate voltages of the 7 transistors in NMOS transistor group 1133. When the binary values of the 7 count signals 1139 increase, the effective resistance of NMOS transistor group 1133 decreases.

If the voltage Vin+ at the positive input of comparator 1134 is less than the voltage at the negative input of comparator 1134 (VCCIO/2), the output voltage of comparator 1134 is low. When the output voltage of comparator 1134 is low, the binary value of count signals 1139 decreases, causing the effective resistance of NMOS group 1133 to increase.

The voltage Vin+ eventually oscillates across the VCCIO/2 threshold level as discussed above with respect to circuit 1101. A pattern detect circuit 1136 detects the toggling output voltage of comparator 1134 and enables register 1138 to latch the values of count signals 1139. FIG. 3 illustrates an example of pattern detect circuit 1136.

The output signal of pattern detect circuit 1136 transitions from low to high when it detects the output voltage of comparator 1134 satisfies the logic function of logic block 320. The output of circuit 1136 is coupled to the enable input of register 1138. Register 1138 includes 7 serially coupled flip-flops that store the 7 count signals OCTCALN[6:0] on a rising edge of the output signal of pattern detect circuit 1136. Count signals OCTCALN[6:0] can be transmitted through multiplexer 1119 to IO buffer 1100 to control the termination resistance of transistors in NMOS group 1121, as discussed above.

Multiplexer 1119 can be set to select the OCTCALN[6:0] signals when a user wants the termination resistance of NMOS group 1121 to match the resistance of external resistor 1131. When multiplexer 1119 selects OCTCALN[6:0], NMOS group 1121 has the same effective resistance as NMOS group 1133, which is set to match resistor 1131. When matching the resistance of NMOS group 1121 to resistor 1131, calibration circuit 1102 compensates for silicon process, voltage, and temperature (PVT) variations on the integrated circuit. As a result, calibration circuit 1102 can achieve a very accurate termination resistance (e.g., a +/−10% variation).

Figure 14:
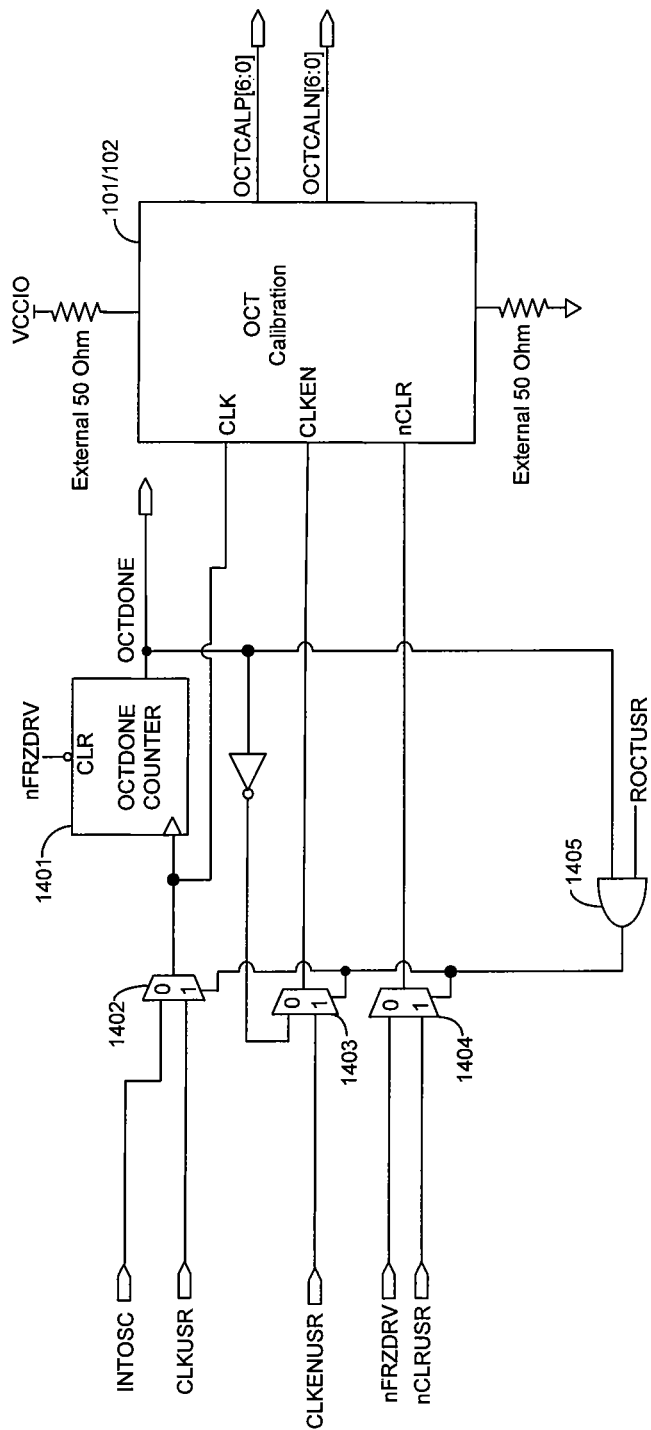
FIG. 14 illustrates an on-chip termination calibration interface, according to an embodiment of the present invention.

FIG. 14 shows an on-chip termination (OCT) calibration interface. Signals INTOSC, nFRZDRV and OCTDONE are generated by a programmable logic device (PLD) control block. Signals CLKUSR, CLKENUSR, and nCLRUSR are generated by the PLD core programmable logic. Signals OCTCALP[6:0] and OCTCALN[6:0] are generated by calibration circuits 1101 and 1102.

By default, the on-chip termination is calibrated after the PLD CRAM bit configuration is completed, but before the PLD enters user mode. The on-chip termination (OCT) is also controlled by OCTDONE counter 1401. Counter 1401 usually counts 256 cycles, and sets the OCTDONE signal to high to indicate OCT calibration is finished.

When the OCTDONE signal is high, multiplexer 1402 selects CLKUSR signal, multiplexer 1403 selects the CLKENUSR signal, and multiplexer 1404 selects the nCLRUSR signal. The core PLD logic disables the OCT calibration circuits 1101/1102 by causing the CLKENUSR signal to transition low and the nCLRUSR signal to transition low.

Multiplexer 1403 couples CLKENUSR to the CLKEN inputs of the calibration circuits. When CLKEN is low, counters 1105 and 1135 as well as pattern detect circuits 1106 and 1136 turn off. Multiplexer 1404 couples nCLRUSR to the nCLR inputs of the calibration circuits. When nCLR is low, the output signals of the counters and pattern detect circuits are cleared to default values.

If CRAM bit ROCTUSR is low, AND gate 1405 blocks the OCTDONE signal from changing the signal at the select inputs of multiplexers 1402-1404. Also, when ROCTUSR is low and OCTDONE is high, a low voltage is sent to CLKEN, disabling calibration circuits 1101 and 1102.

The OCTDONE signal is also sent to a PLD control block to enable the PLD to enter user mode. When PLD is in user mode, the user is given the choice to recalibrate OCT if he needs to, because temperature and voltage may drift from the levels when OCT is calibrated during PLD configuration. To calibrate the OCT in user mode, the user needs to provide the CLKUSR, CLKENUSR, and nCLRUSR signals, and set the CRAM bit ROCTUSR to high during PLD configuratIOn. A user may continuously calibrate OCT for as long as needed. To stop calibration, simply stop CLKUSR clock, or set CLKENUSR to low.

Figure 15:
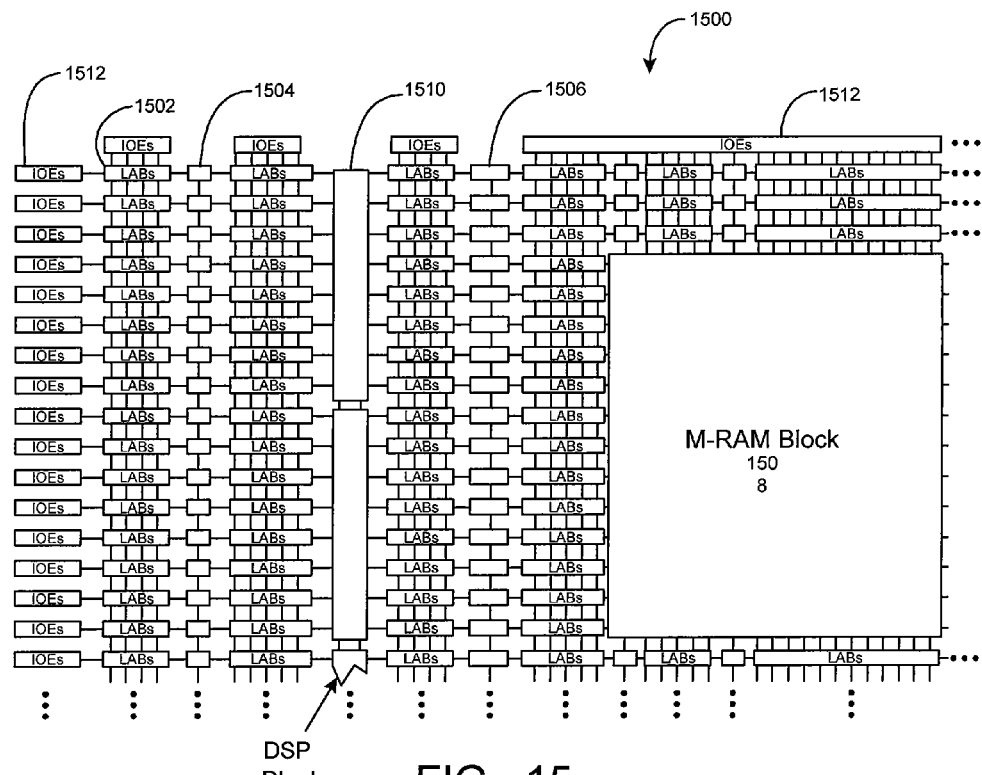
FIG. 15 is a simplified block diagram of a programmable logic device that can be used with the techniques of the present invention.

FIG. 15 is a simplified partial block diagram of one example of PLD 1500 that can include aspects of the present invention, including the calibration circuits and the IO buffer of FIG. 11. Although the present invention is discussed in the context of PLDs and FPGAs, it should be understood that the present invention can be applied to numerous types of integrated circuits including programmable logic integrated circuits and application specific integrated circuits (ASICs).

PLD 1500 is an example of a programmable logic integrated circuit in which techniques of the present invention can be implemented. PLD 1500 includes a two-dimensional array of programmable logic array blocks (or LABs) 1502 that are interconnected by a network of column and row interconnects of varying length and speed. LABs 1502 include multiple (e.g., 110) logic elements (or LEs).

An LE is a programmable logic block that provides for efficient implementation of user defined logic functions. A PLD has numerous logic elements that can be configured to implement various combinatorial and sequential functions. The logic elements have access to a programmable interconnect structure. The programmable interconnect structure can be programmed to interconnect the logic elements in almost any desired configuration.

PLD 1500 also includes a distributed memory structure including RAM blocks of varying sizes provided throughout the array. The RAM blocks include, for example, 1512 bit blocks 1504, 14K blocks 1506, and a block 1508 providing 512K bits of RAM. These memory blocks can also include shift registers and FIFO buffers.

PLD 1500 further includes digital signal processing (DSP) blocks 1510 that can implement, for example, multipliers with add or subtract features. IO elements (IOEs) 1512 located, in this example, around the periphery of the device support numerous single-ended and differential IO standards. It is to be understood that PLD 1500 is described herein for illustrative purposes only and that the present invention can be implemented in many different types of PLDs, FPGAs, and the like.

Figure 16:
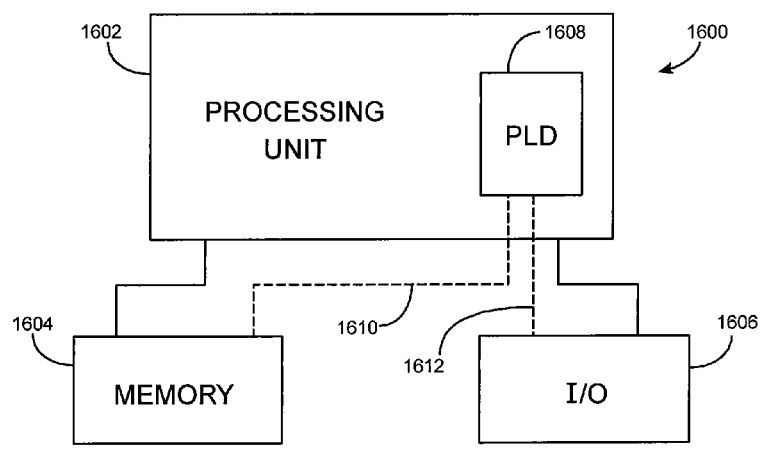
FIG. 16 is a block diagram of an electronic system that can implement embodiments of the present invention.

While PLDs of the type shown in FIG. 15 provide many of the resources required to implement system level solutions, the present invention can also benefit systems wherein a PLD is one of several components. FIG. 16 shows a block diagram of an exemplary digital system 1600, within which the present invention can be embodied. System 1600 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 1600 can be provided on a single board, on multiple boards, or within multiple enclosures.

System 1600 includes a processing unit 1602, a memory unit 1604 and an IO unit 1606 interconnected together by one or more buses. According to this exemplary embodiment, a programmable logic device (PLD) 1608 is embedded in processing unit 1602. PLD 1608 can serve many different purposes within the system in FIG. 16. PLD 1608 can, for example, be a logical building block of processing unit 1602, supporting its internal and external operations. PLD 1608 is programmed to implement the logical functions necessary to carry on its particular role in system operation. PLD 1608 can be specially coupled to memory 1604 through connection 1610 and to IO unit 1606 through connection 1612.

Processing unit 1602 can direct data to an appropriate system component for processing or storage, execute a program stored in memory 1604 or receive and transmit data via IO unit 1606, or other similar function. Processing unit 1602 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLDs 1608 can control the logical operations of the system. In an embodiment, PLD 1608 acts as a reconfigurable processor, which can be reprogrammed as needed to handle a particular computing task. Alternately, programmable logic device 1608 can itself include an embedded microprocessor. Memory unit 1604 can be a random access memory (RAM), read only memory (ROM), fixed or flexible disk media, PC Card flash disk memory, tape, or any other storage means, or any combination of these storage means.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising receiver circuitry operable to:
    enable a conductive path between an integrated circuit input/output pad and a first supply voltage when an input signal is in a first logic state and an enabling signal is in a second logic state;
    disable the conductive path between the input/output pad and the first supply voltage when both the input signal and the enabling signal are in the second logic state;
    disable the conductive path between the input/output pad and the first supply voltage when a programmable bit and the enabling signal are in the first logic state; and
    enable the conductive path between the input/output pad and the first supply voltage when the programmable bit is in the second logic state and the enabling signal is in the first logic state, the enabling of the conductive path between the input/output pad and the first supply voltage being independent of an output signal of the input/output pad, wherein the enabling of a conductive path is accomplished using a transistor, a gate voltage of the transistor being independent of the output signal.

2. The integrated circuit of claim 1, wherein the receiver circuitry is further operable to:
disable a conductive path between the input/output pad and a second supply voltage when the input signal is in the first logic state and the enabling signal is in the second logic state;
enable the conductive path between the input/output pad and the second supply voltage when both the input signal and the enabling signal are in the second logic state;
disable the conductive path between the input/output pad and the second supply voltage when the programmable bit and the enabling signal are in the first logic state; and
enable the conductive path between the input/output pad and the second supply voltage when the programmable bit is in the second logic state and the enabling signal is in the first logic state, the enabling of the conductive path between the input/output pad and the second supply voltage being independent of an output signal of the input/output pad.

3. The integrated circuit of claim 1, wherein the enabling signal is not responsive to the output signal of the input/output pad.

4. The integrated circuit of claim 2, wherein:
the receiver circuitry comprises pull-up circuitry configured to enable and disable the conductive path between the input/output pad and the first supply voltage,
the pull-up circuitry comprises a plurality of groups of p-channel transistors coupled in parallel between the input/output pad and a first supply terminal,
the receiver circuitry comprises pull-down circuitry configured to enable and disable the conductive path between the input/output pad and the second supply voltage; and
the pull-down circuitry comprises a plurality of groups of n-channel transistors coupled in parallel between the input/output pad and a second supply terminal.

5. The integrated circuit of claim 4, further comprising a plurality of predrivers, each coupled to a group of the n-channel transistors in the pull-down circuitry.

6. The integrated circuit of claim 4, wherein the first supply voltage is coupled to VCC and the second supply voltage is coupled to ground.

7. The integrated circuit of claim 6, wherein a high voltage range is approximately from one-half VCC to VCC, and a low voltage range is approximately from ground to one-half VCC.

8. The integrated circuit of claim 1, wherein the receiver circuitry comprises pull-up circuitry configured to enable and disable the conductive path between the input/output pad and the first supply voltage, and the pull-up circuitry comprises a plurality of groups of p-channel transistors, wherein:
drains of each transistor in each of the plurality of groups of p-channel transistors are coupled together,
sources of each transistor in each of the plurality of groups of p-channel transistors are coupled together,
gates of each transistor in each of the plurality of groups of p-channel transistors are coupled together,
the gates in each group of p-channel transistors are driven by a separate predriver.

9. The integrated circuit of claim 1, wherein the input/output pad is formed on a field programmable gate array (FPGA) integrated circuit.

10. An integrated circuit comprising:
an output stage operable to generate an output signal, the output stage comprising:
a pull-up circuit comprising a pull-up transistor responsive to an input signal, an enabling signal and a programmable bit, the enabling signal not being responsive to an output signal, a gate voltage of the pull-up transistor being independent of the output signal, the pull-up transistor operable to be:
in a conductive state when the input signal is in a first logic state and the enabling signal is in a second logic state;
in a non-conductive state when both the input signal and the enabling signal are in the second logic state;
in a non-conductive state when the programmable bit and the enabling signal are in the first logic state; and
in a conductive state when the programmable bit is in the second logic state and the enabling signal is in the first logic state.

11. The integrated circuit of claim 10, the output stage further comprising:
a pull-down circuit comprising a pull-down transistor responsive to the input signal, the enabling signal and the programmable bit, a gate voltage of the pull-down transistor being independent of the output signal, the pull-down transistor configured to be:
in a non-conductive state when the input signal is in the first logic state and the enabling signal is in the second logic state;
in a conductive state when both the input signal and the enabling signal are in the second logic state;
in a non-conductive state when the programmable bit and the enabling signal are in the first logic state; and
in a conductive state when the programmable bit is in the second logic state and the enabling signal is in the first logic state.

12. A method comprising:
enabling a conductive path between an integrated circuit input/output pad and a first supply voltage when an input signal is in a first logic state and an enabling signal is in a second logic state;
disabling the conductive path between the input/output pad and the first supply voltage when both the input signal and the enabling signal are in the second logic state;
disabling the conductive path between the input/output pad and the first supply voltage when a programmable bit and the enabling signal are in the first logic state; and
enabling the conductive path between the input/output pad and the first supply voltage when the programmable bit is in the second logic state and the enabling signal is in the first logic state, the enabling of the conductive path between the input/output pad and the first supply voltage being independent of an output signal of the input/output pad, wherein the enabling of a conductive path is accomplished using a transistor, a gate voltage of the transistor being independent of the output signal.

13. The method of claim 12, further comprising:
disabling, with receiver circuitry, a conductive path between the input/output pad and a second supply voltage when the input signal is in the first logic state and the enabling signal is in the second logic state;
enabling the conductive path between the input/output pad and the second supply voltage when both the input signal and the enabling signal are in the second logic state;
disabling the conductive path between the input/output pad and the second supply voltage when the programmable bit and the enabling signal are in the first logic state; and enabling the conductive path between the input/output pad and the second supply voltage when the programmable bit is in the second logic state and the enabling signal is in the first logic state, the enabling of the conductive path between the input/output pad and the second supply voltage being independent of an output signal of the input/output pad.

14. The method of claim 12, wherein the enabling signal is not responsive to the output signal of the input/output pad.

15. The method of claim 12, wherein:
the receiver circuitry comprises pull-up circuitry configured to enable and disable the conductive path between the input/output pad and the first supply voltage,
the pull-up circuitry comprises a plurality of groups of p-channel transistors coupled in parallel between the input/output pad and a first supply terminal,
the receiver circuitry comprises pull-down circuitry configured to enable and disable the conductive path between the input/output pad and the second supply voltage; and
the pull-down circuitry comprises a plurality of groups of n-channel transistors coupled in parallel between the input/output pad and a second supply terminal.

16. The method of claim 15, further comprising a plurality of predrivers, each coupled to a group of the n-channel transistors in the pull-down circuitry.

17. The method of claim 15, wherein the first supply voltage is coupled to VCC and the second supply terminal is voltage to ground.

18. The method of claim 17, wherein a high voltage range is approximately from one-half VCC to VCC, and a low voltage range is approximately from ground to one-half VCC.

19. The method of claim 12, wherein the receiver circuitry comprises pull-up circuitry configured to enable and disable the conductive path between the input/output pad and the first supply voltage, and the pull-up circuitry comprises a plurality of groups of p-channel transistors, wherein:
drains of each transistor in each of the plurality of groups of p-channel transistors are coupled together,
sources of each transistor in each of the plurality of groups of p-channel transistors are coupled together,
gates of each transistor in each of the plurality of groups of p-channel transistors are coupled together,
the gates in each group of p-channel transistors are driven by a separate predriver.

20. The method of claim 12, wherein the input/output pad is formed on a field programmable gate array (FPGA) integrated circuit.

21. The integrated circuit of claim 1, wherein when the conductive path between the input/output pad and the first supply voltage is enabled, a gate of the transistor remains uncoupled from the input/output pad.

* * * * *